US 6,645,541 B2

United States Patent
Morii et al.

(10) Patent No.: US 6,645,541 B2
(45) Date of Patent: *Nov. 11, 2003

(54) ENHANCING PUFFABLE FOOD PRODUCTS AND FOR PRODUCTION THEREOF

(75) Inventors: Kazuaki Morii, Sakurai (JP); Kiyoshi Morii, Sakurai (JP); Simpey Kuramoto, Allendale, NJ (US); Roland Abate, Allendale, NJ (US)

(73) Assignees: Wynn Starr Flavors, Inc., Allendale, NJ (US); Morii Foods Co., Ltd., Sukurai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,136

(22) Filed: Oct. 22, 2001

(65) Prior Publication Data

US 2002/0132033 A1 Sep. 19, 2002

Related U.S. Application Data

(63) Continuation-in-part of application No. 09/812,803, filed on Mar. 20, 2001, now Pat. No. 6,461,660.
(60) Provisional application No. 60/276,374, filed on Mar. 16, 2001, provisional application No. 60/241,866, filed on Oct. 20, 2000, and provisional application No. 60/235,732, filed on Sep. 27, 2000.

(51) Int. Cl.$^7$ ............................................. A21D 13/00
(52) U.S. Cl. ................. 426/559; 426/241; 426/242; 426/445; 426/808
(58) Field of Search .................. 426/94, 559, 241, 426/242, 446, 450, 234, 237, 445; 126/808

(56) References Cited

U.S. PATENT DOCUMENTS

| 2,701,200 A | | 2/1955 | Huber | |
| 3,259,503 A | * | 7/1966 | Tan et al. | 426/559 |
| 3,800,050 A | * | 3/1974 | Popel | 426/343 |
| 4,965,081 A | * | 10/1990 | Lazarus | 426/559 |
| 6,461,660 B2 | * | 10/2002 | Morii et al. | 426/559 |

FOREIGN PATENT DOCUMENTS

| EP | 0273475 | 7/1988 |
| EP | 0367031 | 5/1990 |
| EP | 0542510 | 5/1993 |
| EP | 0836807 | 4/1998 |
| GB | 847677 | 9/1960 |
| GB | 1074117 | 6/1967 |
| GB | 1261730 | 1/1972 |
| GB | 1271793 | 4/1972 |
| GB | 1472748 | 5/1977 |
| GB | 1484518 | 9/1977 |
| GB | 2008924 | 6/1979 |
| GB | 2111816 | 7/1983 |
| WO | 8301729 | 5/1983 |
| WO | WO 9507629 | 3/1995 |
| WO | WO 9633624 | 10/1996 |

* cited by examiner

*Primary Examiner*—Lien Tran
(74) *Attorney, Agent, or Firm*—Brian B. Shaw; Stephen B. Salai; Harter, Secrest & Emery LLP

(57) ABSTRACT

Methods for preparing a puffable food product suitable for cooking by microwaving, deep fat frying and hot air cooking are disclosed. The methods include mixing a starch with water at a temperature and for a time sufficient to at least partially gelatinize the starch, forming the mixture into a sheet and subjecting the sheet to a steam treatment to fully gelatinize the starch. The sheet is then cooled and cut into pellets of a desired shape and the pellets are dried. The inclusion of flavoring ingredients to improve the puffability is also disclosed.

15 Claims, No Drawings

ENHANCING PUFFABLE FOOD PRODUCTS AND FOR PRODUCTION THEREOF

CROSS-REFERENCE TO RELATED APPLICATIONS

This application is a continuation-in-part application of and claims priority from U.S. non-provisional patent application Ser. No. 09/812,803, filed on Mar. 20, 2001 now U.S. Pat. No. 6,461,660 B2, and also claims priority from U.S. Provisional Patent Application Serial No. 60/235,732, filed Sep. 27, 2000, U.S. Provisional Patent Application Serial No. 60/241,866 filed Oct. 20, 2000, and U.S. Provisional Patent Application No. 60/276,374 filed Mar. 16, 2001. The contents of each of the aforementioned non-provisional and provisional applications are incorporated herein by reference.

BACKGROUND

1. Field of the Invention

The present invention is directed to methods of enhancing food products. Specifically, the present invention is directed to methods of enhancing the puffing characteristics of microwaveable food products such as potatoes, mung beans, wheat, corn, soy beans, rice and rice powders, tapioca, bean starches and starches from other food products and food products obtained therefrom.

2. Background of the Invention

The market for microwaveable snacks focuses on popcorn which the consumer can easily prepare by "popping" a bag of popcorn immersed in butter flavored oil and salt in the microwave for 2 to 4 minutes. The basis for popping is the retention of moisture in the corn, which "explodes" in the microwave with a popping sound and thereby "gelatinizes" the carbohydrates in an expanded state.

There are many known processes for preparing microwaveable snack products. For example, U.S. Pat. No. 5,108,772 issued to Wilbur (hereinafter referred to as "the '772 patent") discloses microwaveable poppable pellets and their methods of preparation. Normally, the consumer can tell when the product is finished in the microwave oven when the sound of popping ceases. A problem with using puffable pellets in place of popcorn in a microwave snack is the lack of a sound cue to indicate completion of the microwave-heating step because the pellets expand gradually rather than explode as does popcorn. However, Thus, a consumer would have to rely on visual cues to determine the completion of the microwave-heating step. The '772 patent solves this problem by providing a pellet having an outer skin or casing of sufficient tensile strength to allow the buildup of internally generated steam pressure. When the pressure is sufficient, the pellet explodes explosively thus giving an audible clue of the termination of the microwave heating step. Thus, the microwave snacks prepared according to the '772 patent resemble that of popcorn kernels. However, the food products prepared from this process are complicated to make and does not have the same desirable characteristics of a normal puffable product.

U.S. Pat. No. 6,083,552, issued to Kershman, et al. (hereinafter referred to as "the '552 patent") discloses microwaveable snacks composed of a combination of popcorn and expandable or puffable food pellets. The combination of these two products minimizes scorching and burning of the starched-based puffable component of the mixture.

Food products from known processes such as those pellets disclosed in the above patents have solved the problem of providing a solely starch-based product which exhibits puffing uniformly without combining popcorn.

Also, in general, microwaveable food products are believed to have better puffabilty when their shapes are round because the corner parts in square shapes tend to remain uncooked. The '772 patent limits the disclosed pellets to a rounded shape Generally, the shapes disclosed in these patents are produced by extrusion, press molding and the like. However, if the shaped product is produced by dye cutting, i.e., by forming a sheet of the product and cutting out the shape with a die, e.g., in cookie cutter fashion, problems can arise due to material loss. Thus, the material between the die cuts is non usable.

SUMMARY OF THE INVENTION

We have discovered a method for preparing a food product which can be quickly cooked by rapid cooking processes, such as microwaving, hot air heating, e.g., by passing heated air at a temperature of about 400–480 C.° over the food product, or deep fat frying in oil that has been preheated to a temperature of at least 340 to 345° C. The inventive product exhibits excellent puffable characteristics. As used herein, the term "puffable" means the ability of the product or pieces thereof to expand in volume, usually at least by twofold, within a short time, e.g., from several seconds to less than two minutes, when subjected to rapid heating. The term "piece" herein means a discrete shape element of the food product, usually capable of being contained in a bag for selling to the consumer. The inventive food product is easily cooked by such rapid heating to obtain a delicious crunchy snack without problems, such as, overcooking or the need to utilize components to provide audible cues as to cooking times, e.g., popcorn kernels.

The inventive food product is obtained by first mixing a gelatinizable starch containing only trace amounts of protein with water at a temperature and for a time sufficient to at least partially gelatinize the starch. The thus treated mixture is then formed into a sheet and subjected to a steam treatment to completely gelatanize the starch. The sheet is then shaped into pellets by die cutting and the pellets are dried to a moisture contend of about 7.5 to 19.0 percent by weight. All percent weights used herein are based on the weight of the total composition

DETAILED DESCRIPTION OF THE INVENTION

The inventive mixture has a moisture content in the range of from about 7.5% to about 19.0% by weight. All weights expressed herein are percentage weight based of the total mixture. Preferably, the moisture content of the mixture is from about 8% to about 16% by weight of the mixture. Even further preferably, the moisture content of the mixture is from about 10% to about 15% by weight of the mixture. Most preferably, the moisture content of the mixture is from about 11% to about 14% by weight of the mixture. In yet another preferred embodiment, the moisture content of the mixture is about 12% by weight of the mixture.

Starch suitable for use in the present invention include starch obtained from potatoes, mung beans, wheat, corn, soy beans, rice and rice powders, tapioca, beans. Mixtures of such starches may be used Preferably, the food product is formed from 100% potato starch. The starch from each of the above named sources each possesses somewhat different characteristics, although all are usable in the inventive method. However, the most preferred starch source is potato starch. Depending on the end product desired, potato starch may be mixed with small amounts of starch from any one or more of the other named starch sources. For example, the different starches provide different textures, and may vary in puffability characteristic somewhat and the skilled worker in this field would have no problem varying the composition to achieve her desired end characteristics.

It is contemplated that several different seasonings can be used in the method of the present invention. Preferably, the seasoning is selected from the group including salt, vinegar, barbecue seasoning, nacho seasoning, sour cream and onion seasoning, sweet and sour seasoning, sweet seasoning, hot and spicy seasoning, chicken flavor seasoning, savory flavor seasoning, fruit seasonings, citrus seasoning, vegetable seasonings, MSG, HVP, Yeast Autolysates flavor reaction products and other natural and artificial flavored seasonings such as fruit, vegetable and dairy flavored seasonings.

The food products or pellets prepared by the method of the present invention can include virtually any shape obtainable by die cutting of a sheet, e.g., round, square, triangular, and the like. The inventive food products prepared by the method of the present invention may be cooked by any type of rapid heating procedure. Typically, these include microwaving, hot air, e.g., heating in a hot air device, such as, those use for hot air popping of popcorn, deep fat frying. These are all methods which heat the food product to a high temperature at a relatively high speed, e.g., in a matter of seconds or in less than a minute or two. The inventive food products can also be cooked using other "explosion" processes such as those used in cereal manufacturing, or the like. Regardless of what process is used to cook the food products, the inventive food product still exhibits excellent and puffing characteristics. Further, the expanded food products have very good texture, mouth feel and taste characteristics.

The mixture of the starch and water may be heated in a variety of methods to effect at least partial gelatinization of the starch. Typically, a jacket mixer may be used. While the heating temperature used for this step is dependant on the type of starch, i.e., the starch source, generally, the mixture is heated at a temperature of from about 55.0° C. to 70.0° C. For potato starch, the mixture of starch and water is heated at a temperature of from about 60.0° C. to 65.0° C. for a time period of from about four to six minutes to effect at least partial gelatinization. It is best that the starch not be completely gelatinized in this step since the mixture increases in viscosity with increased gelatinization and it must be sufficiently pourable to form into sheet form. To some extent the amount of gelatinization depends on the properties of the particular starch, i.e., the source of the starch.

The partially gelatinized mixture is then formed onto a sheet. This is generally accomplished by pouring the mixture into a flat pan or onto a conveyor or roller belt for continuous processing. The thickness of the sheet is generally is in the range from about 0.9 mm to 3.0 mm prior to the steam treatment. Preferably the sheet thickness prior to the steam treatment is from about 1.3 mm to 2.7 mm and most preferably from about 1.3 mm to 1.7 mm. The thickness of the sheet prior to the steam treatment is not particularly critical, but does effect the thickness of the final product since the die cut pellets are dried after the cutting. Thus, the thickness of the dried pellets corresponding to the above presteaming thickness, respectively, would be about 0.4 mm to 2.7 mm, preferably from about 0.8 mm to 2.4 mm and most preferably about 0.8 mm to 1.4 mm.

After the mixture is formed into a sheet and the sheet is subjected to a steam treatment. This effects complete gelatinization of the mixture. The steam treatment is carried out by contacting the sheet with steam for a period of time to produce complete gelatinization. This can be achieved by placing the sheet into a steam oven or other procedures well known in the art. The steam treatment may be carried out under atmospheric pressure. The amount of time required for the steam treatment depends on the thickness of the sheet and source of the starch. Generally, the steam treatment is carried out for about 1 to 7 minutes at a steaming temperature of about 95 to 100° C. longer steaming may occasionally result in producing a unevenness in the surface of the sheet, e.g., craters may form in the surface. Preferably, the steaming time is about 1 to 5 minutes for a continuous or in-line process and about 3 to 6 minutes for a batch steamer. The most preferred time required for steaming is from about 3 to 5 minutes.

After the steam treatment, the sheet is cooled and allowed to dry. This can be effected by air drying or heating. It is important that the sheet be dried only to the extent such that it can be cut or formed into the desired pellet shape. Thus, if the sheet is dried too much, it may become too brittle so that when it is shaped, as by die cutting, the pellets will fracture. The degree of dryness is easily adjusted by the skilled artisan to achieve the desired result, i.e., size and shape of the pellets. Usually, the finish product in pellet form have a moisture content of from 7.5 to 19% by weight.

The product of the present invention exhibits excellent puffing characteristics when rapidly heated, e.g., in a microwave oven, hot air popper or when subjected to deep fat frying. In addition, depending on the starch source and the amount and type of seasoning added in accordance with the invention, one may obtain an audible popping or cracking sound when the pellets are being heated so that an audible signal is provided to determine when the heat time is finished. Also, if the pellets are packaged in a microwave cooking bag, upon heating of the bagged product, the bag expands and the consumer can determine when the cooking is done by visual observation of the cessation of the expansion of the bag.

As used herein, the phrase "shaping" includes the steps of cooling the sheet after die cutting and drying it as well as any other conventional steps required to form expandable compositions hereinafter referred to as "pellets."

The following examples are provided to assist in further understanding the present invention. The particular materials and conditions employed are intended to be further illustrative of the invention and are not limiting upon the reasonable scope thereof.

EXAMPLE 1

A microwaveable food product of the present invention was prepared according to the following procedure. A mixture of 300 grams (g) of potato starch, 20 grams of a salt and vinegar seasoning, and 320 cc of heated water was prepared by using a jacket mixer.

The salt and vinegar seasoning had the composition shown in Table 1.

TABLE 1

| Ingredient | Weight % of the Composition |
|---|---|
| Maltrin | 50.0 |
| Salt | 29.0 |
| Essicum Vinegar | 15.0 |
| Vinegar Powder | 3.0 |
| Citric Acid | 3.0 |

The mixture was then poured through a belt roller and sheets having a thickness of 2.0±0.7 mm were obtained. The sheets were then subjected to a steam process at 95 to 100° C. for 5 to 7 minutes to fully gelatinize the starch. The sheets were then cooled at 2 to 10° C. for 2 hours. After cooling, the sheets were die cut to form round pieces of 20 to 40 mm in diameter. The cut pieces were further dried to have a moisture of 8 to 15% at a thickness of 2.0±0.7 mm. The potato food products prepared in this example had round shapes 20 to 40 mm in diameter and 1.5 cm×2.0 cm rectangular shapes.

The potato food products prepared by this procedure had enhanced puffability and deep fat frying puffing characteristics. In particular, deep fat frying at 345° F. or at a higher temperature such as that used in frying french fries results in a unique texture and mouth feel. The inclusion of seasonings such as spices, salt, sugar, etc. greatly enhances the puffability of fabricated starch based formulations.

Furthermore, the rectangular shaped potato food products prepared in this example had enhanced puffability and hot air puffing characteristics. The inclusion of seasonings such as spices, salt, sugar, and the like greatly enhances the puffability of fabricated starch based formulations.

EXAMPLE 2

A microwaveable food product of the present invention was prepared according to the following procedure.

A mixture of 190 grams of potato starch and 190 cc of water was prepared by using a jacket mixer for 4 to 6 minutes at temperatures from 55 to 70° C. A preferable temperature to prepare this mixture is 60° C.±2° C.

The mixture was then poured though a belt roller and sheets were formed. The sheets were then subjected to a steam process at 95 to 100° C. for 5 to 7 minutes to fully gelatinize the starch. The sheets were then cooled at 2 to 10° C. for 2 hours. After cooling, the sheets were die cut to form square, rectangular and round pieces. The cut pieces were further dried to have a moisture content of 8 to 16%, preferably 12 to 14%, at thickness of 0.4 to 2.0 mm, preferably 0.9 to 1.4 mm, in a drying room at 40 to 45° C. for 2 to 2½ hours. the potato food products were prepared in square, rectangular and round shapes. The potato food products prepared by this procedure had enhanced puffability and deep fat frying puffing characteristics.

EXAMPLE 3

A microwaveable food product of the present invention including barbecue seasoning was prepared by the procedure described in Example 2 wherein barbeque seasoning was added within the matrix of the potato starch. The barbecue seasoning had the composition shown in Table 2.

TABLE 2

| Ingredient | Weight % of the Composition |
|---|---|
| Sugar | 20.0 |
| Salt | 20.0 |
| HVP | 10.0 |
| Spices | 50.0 |

The barbecue seasoned food products had outstanding puffability. Inclusion of 5 to 20% of a seasoning did not impede the snack formation process of sheeting, forming and cutting and drying to 15% $H_2O$±3% facilitated the process. The microwaved food snacks had improved mouth feel and texture.

EXAMPLE 4

A microwaveable food product of the present invention was prepared using potato starch and water, according to the procedure described in Example 2. In particular, a mixture of 190 grams of potato starch and 190 cc of water having a temperature of 60° C. was prepared by using a jacket mixer for 4 to 6 minutes.

Using potato starch did not impede the overall process of forming pellets. Also, adding heated water having a temperature of 60° C. to the potato starch and mixing the materials using a jacket mixer created a fully mixed composition which easily and smoothly was formed into a sheet (referred to herein as "sheeting". The sheets had a moisture content between 10% to 15% and the dried pellets were almost transparent, strong and not easily breakable.

If potato starch, though, was mixed with 80° C. water, the mixture would become extremely high in viscosity and thus impedes the sheeting process. Therefore, it is very important to understand the gelatinization temperature to fully gelatinize the compound and in the case of potato starch, the gelatinization temperature is generally in the range of from about 55 to about 65° C.

The dried pellets obtained by the procedure described in this example were further tested in a microwave. In particular, ninety die cut 1.5 cm×1.5 cm square pellets were placed in a microwaveable bag, sealed and microwaved using a Panasonic 1,050 Watt (hereinafter "W") microwave. After approximately 5 to 10 seconds, a popping sound was heard. As the puffable pellets expanded, not only was a puffing sound heard, but also the popcorn bag inflated as the moisture from the pellets lifted up the bag. After about 45 seconds, the popping sound ceased and the microwaveable bag was fully inflated. The bag was opened following the same procedures used when opening well known microwave popcorn products and unique, uniformly puffed potato starch products with outstanding expansion were obtained which in this case were totally free of fat.

EXAMPLE 5

The same process as described in Example 4 was used to prepare a microwaveable food product, however, corn starch was used instead of potato starch. In particular, 190 g corn starch was mixed with 190 cc water heated to a temperature of 75° C. which is the gelatinization temperature of corn starch. The mixture of corn starch and water was formed into a sheet and exhibited outstanding sheetability. After being steamed, cooled, die cut and dried, the pellets obtained were not easily breakable.

Then, ninety of these die cut 1.5 cm×1.5 cm square shaped pellets were placed in a standard microwaveable bag, sealed and microwaved using a Panasonic 1,050 W microwave. The corn starch based pellets did not expand uniformly and resulted in undesirable starch material which was part unpuffed and part burned. Furthermore, in the pellets which were cooked and not burned, the expandability was not as good as that obtained using potato starch as the base food product. Also, the texture of the microwaved corn starch based pellets was hard.

EXAMPLE 6

A microwaveable food product of the present invention was prepared according to the procedure described in Example 4, however, wheat flour starch was used instead of potato starch. In particular, 190 g of wheat flour was mixed with 190 cc of water having a temperature of 60° C. The mixture, though, was not suitable for sheeting. Further, after adding additional water, it was still difficult to sheet. The mixture was then manually sheeted and steamed and had an undesirable surface with many craters. After being die cut to form 1.5 cm×1.5 cm square shape pellets, the die cut pieces were dried to have a 10–15% moisture content. The pellets were not easily breakable, though, they were inconsistent in their thickness.

Then, ninety of these die cut 1.5 cm×1.5 cm square shaped pellets were placed in a standard microwaveable bag, sealed and microwaved using a Panasonic 1,050 W microwave. The wheat flour based pellets did not expand uniformly and resulted in an undesirable flour material which was part burned and part unpuffed. Further, in the pellets which were cooked, the expandability was not as good as that obtained using potato starch as the base food product. Also, the texture of the microwaved wheat flour based pellets was hard.

EXAMPLE 7

A microwaveable food product of the present invention was prepared according to the procedure described in Example 4, however, tapioca starch was used instead of potato starch. In particular, 190 g of tapioca starch was mixed with 190 cc of water having a temperature of 70° C. The mixture of tapioca starch and water, though, was not found to be suitable for sheeting. The mixture was then manually sheeted and steamed, cooled, die cut, and dried. The pellets obtained were not easily breakable.

Then, ninety of these die cut 1.5 cm×1.5 cm square pellets were placed in a standard microwaveable bag, sealed and microwaved using a Panasonic 1,050 W microwave. After about 45 seconds, the popping sound ceased and the microwaveable bag was somewhat inflated. The popping sound was not as loud as what had been heard using potato starch as the primary food ingredient in Example 4. The bag was opened using the same procedures used when opening well known popcorn bags, and unique, uniformly puffed products with outstanding expansion were obtained.

EXAMPLE 8

A microwaveable food product of the present invention was prepared according to the procedure described in Example 4, however, waxy corn was used instead of potato starch. In particular, 190 g of waxy corn was mixed with 190 cc of water heated to its gelatinization temperature of 70° C. The mixture of waxy corn and water was not suitable for sheeting. The mixture was then manually sheeted and then steamed, cooled, die cut and dried. The pellets obtained were not easily breakable.

Then, ninety of these die cut 1.5 cm×1.5 cm square pellets were placed in a standard microwaveable bag, sealed and microwaved using a Panasonic 1,050 W microwave. After approximately 5–15 seconds, a popping sound was heard. As the puffable pellets expanded, not only was a puffing sound heard, but the popcorn bag also inflated as the moisture from the pellets lifted up the bag. Further, after about 45 seconds, the popping sound ceased and the microwaveable bag was fully inflated. The bag was opened using the same procedures used when opening well known popcorn bags and unique, uniformly puffed products with outstanding expansion were obtained.

EXAMPLE 9

A microwaveable food product of the present invention was prepared according to the procedure described in Example 4, however, a combination of potato starch and tapioca starch was used instead of only potato starch. In particular, 95 g of potato starch and 95 g of tapioca starch was mixed with 190 cc of water heated to a temperature of 60° C. which is the gelatinization temperature of potato starch. The mixture of potato starch, tapioca starch and water was not so much suitable for sheeting. However, by mixing the two food products, the sheeting process became easier than what was found to be difficult as described in Example 6, but not as smooth as described in Example 2. The mixture was then sheeted and then steamed, cooled, die cut and dried. The pellets obtained were not easily breakable.

Then, ninety of these die cut 1.5 cm×1.5 cm square pellets were placed in a standard microwaveable bag, sealed and microwaved using a Panasonic 1,050 W microwave. After approximately 10–25 seconds, a popping sound was heard. As the puffable pellets expanded, not only was a puffing sound heard, but the popcorn bag also inflated as the moisture from the pellets lifted up the bag. Further, after about 45 seconds, the popping sound ceased and the microwaveable bag was fully inflated. The bag was opened using the same procedures used when opening well known popcorn bags and unique, uniformly puffed products with somewhat outstanding expansion were obtained. However, although the pellets seemed to have expanded uniformly, there were some pellets that still had a tiny portion uncooked inside.

EXAMPLE 10

A microwaveable food product of the present invention was prepared according to the procedure described in Example 4, however, a combination of potato starch and corn starch was used instead of only potato starch. In particular, 152 g of potato starch and 32 g of corn starch was mixed with 190 cc of water heated to a temperature of 60° C. which is the gelatinization temperature of potato starch. The mixture of potato starch, corn starch and water was somewhat suitable for sheeting while potato starch and corn starch had outstanding sheetability as described in Example 4 and Example 5. After the mixture was sheeted, it was steamed, cooled, die cut and dried. The pellets obtained were not easily breakable.

Then, ninety of these die cut 1.5 cm×1.5 cm square pellets were placed in a standard microwaveable bag, sealed and microwaved using a Panasonic 1,050 W microwave. After about 45 seconds, the pellets were cooked. The bag was opened following the same procedures used when opening well known popcorn bags and unique, uniformly puffed products were obtained. Although the pellets seemed to have expanded uniformly, the pellets expanded somewhat less than the 100% potato starch based pellets and the texture of the pellets was somewhat hard.

Table 3 below summarizes the results from the Examples 4 through 10 as well as the results of some other combinations of food products which were tested according to the same procedure used in Examples 4–10.

pellets. Corn starch, though, resulted in an undesirable starch material which was part burned and part unpuffed and the corn starch based pellets that were cooked and not burned had very poor expandability.

TABLE 3

| EXAMPLE NUMBER | Starch Source | Water Amount (cc) | Water Temperature (° C.) | Sheeting | Puffability |
|---|---|---|---|---|---|
| 4 | Potato Starch (190 g) | 190 | 60 | 1 | 1 |
| 5 | Corn Starch (190 g) | 190 | 75 | 1 | 3 |
| 6 | Wheat Flour (190 g) | 190 | 60 | 4 | 3 |
| 7 | Tapioca Starch (190 g) | 190 | 70 | 3 | 1 |
| 8 | Waxy Corn (190 g) | 190 | 70 | 4 | 1 |
| 9 | Potato Starch (190 g) + Tapioca | 190 | 60 | 3 | 2 |
| 10 | Starch (190 g) | 190 | 60 | 2 | 2 |
| N/A | Potato Starch (152 g) + Corn Starch | 190 | 70 | 3 | 2 |
| N/A | (38 g) | 190 | 60 | 3 | 2 |
| N/A | Potato Starch (190 g) + Tapioca Starch | 190 | 80 | 3 | 2 |
| N/A | (190 g) | 190 | 60 | 3 | 2 |
| N/A | Potato Starch (190 g) + Corn Starch | 190 | 70 | 3 | 2 |
| N/A | (190 g) | 190 | 80 | 2 | 2 |

*Sheeting - 1 being Outstanding and 4 being Extremely Bad
*Puffability - 1 being Outstanding and 3 being Extremely Bad When microwaveable food products are heated in a microwave, the combination of air and moisture within the food product generates pressure that causes the food product to expand. Upon expansion, it is important for the food product to have proportional stretchability with the generated pressure for expansion.

From Table 3 it is readily apparent that potato starch, tapioca starch and waxy corn have outstanding expandability as well as other common properties. In particular, these food products have a relatively high percentage of amylopectin, lower temperatures for gelatinization, higher swelling power when gelatinized and higher peak viscosity when gelatinized.

Further, based on the above examples, it is apparent that in order to obtain excellent puffing characteristics, it is important to create microwaveable food products that are completely gelatinized. Complete gelatinization allows the starch particles to spread throughout the compound and thus results in clear, almost transparent pellets when no flavors are added. Forming a completely gelatinized pellet results in spreading the moisture throughout the entire pellet and superior uniform puffability.

When comparing potato starch to other food starches, potato starch has the lowest gelatinization temperature. Tapioca and waxy corn also have relatively lower gelatinization temperature that will result in complete gelatinization.

When a completely gelatinized and aged pellet is created and microwaved, uniformly distributed moisture within a pellet heats up to generate pressure for expansion. The base food product having higher peel viscosity and higher swelling power in nature, stretches greater in proportion to the pressure generated by microwave heating. Although there is a higher percentage of amylopectin in tapioca and waxy corn compared to potato starch, potato starch has higher peak viscosity as well as the swelling power of amylopectin.

It has also been found that potato starch and corn starch are preferable food products from a processing standpoint as far as mixing, sheeting, steaming, cooling, die cutting and driving while other food products endured difficulties in one or more of the processes required during the production of Accordingly, 100% potato starch has the most preferred characteristics from both a processing and puffability standpoint and thus potato starch is the most preferred primary food product for use in preparing microwaveable expandable food products. In addition, food products which not shown in Table 1 such as mung beans, rice powders, etc., also did not show characteristics superior to potato starch.

The potato starch used in the above examples to obtain microwaveable food products had the following characteristics as shown below in Table 4.

TABLE 4

| Appearance | White Powder |
|---|---|
| Odor | None |
| Crude Protein | 0.1% or less |
| Acidity | 5.5–8.5 |
| Moisture | Less than 18% |
| PH | 5.5–6.5 |
| Brabender Amylograph Reading (4% Water) | 1100 BU–1400 BU |
| Gelatinization Temperature | 61–63° C. |
| % of Ash | 0.2% or less |

The present invention also contemplates using starches from one or more sources. For example, if potato starch is the primary food product, starch from a second source can be admixed. However, because the differences in the gelatinizing temperatures of potato starch and a different starch may result in unstable gelatinization characteristics when mixed, the amount of the second is preferably less than 50% by weight of the amount of potato starch. Otherwise, the second starch may impede all or part of the process including mixing, gelatinizing, sheeting, steaming, forming alpha lattices, cooling, die cutting, drying and puffing. Preferably, the amount of the second starch or combination of starches added to potato starch is in the range from about less than 20% by weight of the amount of potato starch.

Furthermore, although Example 4 illustrates solutions to expand food products in a uniform manner with a popping sound, the present invention also discloses methods of obtaining rather improved puffing characteristics including preferred texture, mouth feel and taste by adding one or more seasonings within the matrix of a food product such as potato starch as discussed above in the Summary of the Invention and shown below in Examples 11–16.

EXAMPLE 11

A microwaveable food product of the present invention including barbecue seasoning was prepared in the same manner as the procedure described in Example 3 above. In particular, a mixture of 190 grams of potato starch and 190 cc of water heated to a temperature of from 55 to 70° C. was prepared using a jacket mixer for 4 to 6 minutes. The sheets formed from the mixture were steamed and cooled and then pre-dried die cut to form 1.5 cm×1.5 cm square shaped pieces. Then, after these pellets were dried to have a 13%±1.5% moisture content, the size of these square shaped pellets shrank to 1.2–1.4 cm×1.2–1.4 cm.

Ninety of these dried pellets were then placed in a standard microwaveable bag and microwaved using a Panasonic 1,050 W microwave. After approximately 5–10 seconds, a popping sound was heard. As the puffable pellets expanded, not only was a puffing sound heard, but the microwaveable bag also inflated as the moisture from the pellets lifted up the bag. Further, after about 45 seconds, the popping sound ceased and the microwaveable bag was inflated. The bag was opened following the same procedures used when opening well known popcorn bags and unique, uniformly puffed products were obtained. The final puffed products had outstanding microwaveability characteristics including improved mouth feel and texture in addition to the added barbeque taste.

EXAMPLE 12

A microwaveable food product of the present invention including chicken seasoning was prepared in the same manner as the procedure described in Example 3 above except that chicken seasoning was added to the matrix of the potato starch instead of barbeque seasoning. The chicken seasoning had the composition shown in Table 5:

TABLE 5

| Ingredient | Weight % of the Composition |
| --- | --- |
| Maltrin | 40 |
| Chicken Dripping Flavor | 60 |

The sheets formed from the mixture of potato starch and water wherein the matrix of the potato starch included the chicken seasoning, were steamed and cooled and then pre-dried die cut to form 1.5 cm×1.5 cm square shaped pieces. Then, after these pellets were dried to obtain a 13%±1.5% moisture content, the size of these square pellets shrank to 1.2–1.4 cm×1.2–1.4 cm.

Ninety of these dried pellets were then placed in a standard microwaveable popcorn bag and microwaved using a Sanyo 1,200 W microwave. After approximately 5–10 seconds, a popping sound was heard. As the puffable pellets expanded, not only was a puffing sound heard, but the popcorn bag also inflated as the moisture from the pellets lifted up the bag. Further, after about 40 seconds, the popping sound ceased and the microwaveable bag was fully inflated. The bag was opened following the same procedures used when opening well known popcorn bags and unique, uniformly puffed products were obtained. The final puffed products had outstanding microwaveability characteristics including improved mouth feel and texture in addition to the added taste of chicken.

It has also been found that including chicken dripping and fried chicken flavors within the starch matrix and deep fat frying the pellet results in finished goods that taste similar to fried chicken skins. The taste and texture somewhat resembles that of "Pork Rinds," except in this case, they would be called "Natural Chicken Rinds."

EXAMPLE 13

A microwaveable food product of the present invention including sour cream and onion seasoning was prepared in the same manner as the procedure described in Example 3 above except that sour cream and onion seasoning was added to the matrix of the potato starch instead of barbeque seasoning. The sour cream and onion seasoning had the composition shown in Table 6.

TABLE 6

| Ingredient | Weight % of the Composition |
| --- | --- |
| Whey Powder | 28 |
| Salt | 15 |
| NFDM | 10 |
| Buttermilk Powder | 10 |
| Sour Cream Powder | 10 |
| Citric Acid | 1 |
| Whey PTX | 5 |
| Flavor | 40 |

The sheets formed from the mixture of potato starch and water wherein the matrix of the potato starch included the sour cream and onion seasoning, were steamed and cooled and then pre-dried die cut to form 1.5 cm×1.5 cm square shaped pieces. Then, after these pellets were dried to obtain a 13%±1.5% moisture content, the size of these square shaped pellets shrank to 1.2–1.4 cm×1.2–1.4 cm.

Seventy of these dried pellets were placed in a standard microwaveable popcorn bag and microwaved using a Westinghouse 850 W microwave. After approximately 5–10 seconds, a popping sound was heard. As the puffable pellets expanded, the popcorn bag inflated as the moisture from the pellets lifted up the bag. Further, after about 50 seconds, the microwaveable bag was fully inflated. The bag was opened following the same procedures used when opening well known popcorn bags and unique, uniformly puffed products were obtained. The final puffed products had outstanding microwaveability characteristics including improved mouth feel and texture in addition to the added taste of sour cream and onion.

EXAMPLE 14

A microwaveable food product of the present invention including barbeque or sour cream and onion seasoning was prepared in the same manner as the procedure described in Example 3 above. The sheets formed from the mixture of potato starch and water wherein the matrix of the potato starch included the barbeque or sour cream and onion seasoning, were steamed and cooled and then pre-dried die cut to form 3.0 cm×8.0 cm square shaped pieces. Then, after these pellets were dried to obtain a 13%±1.5% moisture content, the size of these square shaped pellets shrank to 1.2–1.4 cm×1.2–1.4 cm.

Forty of these dried pellets were then placed in a microwaveable bag, sealed, and microwaved using a General Electric 600 W microwave. After approximately 5–10 seconds, a popping sound was heard. As the puffable pellets expanded, not only was a puffing sound heard, but the popcorn bag also inflated as the moisture from the pellets lifted up the bag. Further, after about 55 seconds, the popping sound ceased and the microwaveable bag was fully inflated. The bag was opened following the same procedures used when opening well known popcorn bags and unique, uniformly puffed products were obtained. The final puffed products had outstanding microwaveability characteristics including improved mouth feel and texture in addition to the added barbeque or sour cream and onion taste.

EXAMPLE 15

A microwaveable food product of the present invention including barbeque seasoning was prepared in the same manner as the procedure described in Example 3 above. The sheets formed from the mixture of potato starch and water wherein the matrix of the potato starch included the barbeque seasoning, were steamed and cooled and then pre-dried die cut to form 3.0 cm×8.0 cm square shaped pieces. Then, after these pellets were dried to obtain a 13%±1.5% moisture content, the size of these square shaped pellets shrank to 1.2–1.4 cm×1.2–1.4 cm. These microwaveable pellets were then placed in a hot air popping machine having a set temperature of 480° F. with adjusted air flow to keep the pellets agitated. The results with respect to expansion were outstanding. Some of the pellets having sour cream and onion seasoning obtained in Example 13 were also tested using a hot air popper having a temperature set to 415° F. and the pellets having sour cream and onion seasoning also had outstanding expansion. The expansion of the puffed pellets prepared using a hot air popper was greater than the size of puffed pellets prepared using a microwave and the puffed food products prepared using a hot air popper had outstanding texture and mouth feel and a taste slightly different from that obtained through microwave heating.

EXAMPLE 16

A microwaveable food product of the present invention including barbeque seasoning was prepared in the same manner as the procedure described in Example 3 above. The sheets formed from the mixture of potato starch and water wherein the matrix of the potato starch included the barbeque seasoning, were steamed and cooled and then pre-dried die cut to form 3.0 cm×8.0 cm square shaped pieces. Then, after these pellets were dried to obtain a 13%±1.5% moisture content, the size of these square shaped pellets shrank to 1.2–1.4 cm×1.2–1.4 cm. These pellets were then deep fat fried using a fryer wherein the temperature of oil was set at 345° F. The expansion results were outstanding. The expansion was greater than the size of puffed pellets prepared using a microwave as described in Example 14 and those puffed using a hot air popper as described in Example 15. In addition, the puffed food products had outstanding texture and mouthful and a taste slightly different from that obtained through microwave heating and hot air popping.

Thus, while there have been described what are presently believed to be the preferred embodiments of the present invention, those skilled in the art will realize that other and further embodiments can be made without departing from the spirit and scope of the invention, and it is intended to include all such further modifications and changes as come within the true scope of the invention.

What is claimed is:

1. A method for preparing a puffable food product comprising:
    (a) mixing a gelatinizable starch with water at a temperature and for a time sufficient to at least partially gelatinize the starch;
    (b) forming a mixture from step (a) into a sheet and subjecting the sheet to a steam treatment to completely gelatinize the starch;
    (c) shaping the sheet from step (b) into pellets; and
    (d) drying the pellets to a moisture content in the range of from about 7.5% to about 19% by weight of the pellets.

2. The method of claim 1 wherein the moisture content of the pellets is from about 8% to about 16% by weight of the pellets.

3. The method of claim 1 wherein the moisture content of the pellets is from about 10% to about 15% by weight of the pellets.

4. The method of claim 1 wherein the moisture content of the pellets is from about 11% to about 14% by weight of the pellets.

5. The method of claim 1 wherein the moisture content of the pellets is about 12%.

6. The method of claim 1 wherein the starch contains less than 0.1% by weight protein.

7. The method of claim 1 wherein the starch is obtained from a source selected from the group consisting of potatoes, mung beans, wheat, corn, soy beans, rice, rice powders, tapioca, bean starches, and combinations thereof.

8. The method of claim 1 wherein the starch is 100% potato starch.

9. The method of claim 1 which further comprises adding a natural or artificial seasoning to the starch prior to step (a).

10. The method of claim 9 wherein the seasoning is selected from the group consisting of salt vinegar, barbecue seasoning, nacho seasoning, sons cream and onion seasoning, sweet and sour seasoning, sweet seasoning, hot seasoning, spicy seasoning, chicken flavor seasoning, savory flavor seasoning, fruit seasonings, citrus seasoning, vegetable seasonings, MSG, HVP, Yeast Autolysates, flavor reaction products and other including dairy, vegetable and fruit flavored seasonings.

11. A method for preparing an edible food comprising heating the pellets of claim 1 at a temperature and for a time sufficient to expand the pellets at least two fold.

12. The method of claim 1 wherein the thickness of the sheet is in the range from about 0.9 mm to 3.0 mm prior to the steam treatment.

13. The method of claim 1 wherein the thickness of the dried pellets are in the range from about 0.4 mm to 2.7 mm.

14. The method of claim 1 wherein the steam treatment of the sheet carried out for about 1 to 7 minutes at a steam temperature of about 95 to 100° C.

15. The method of claim 1, further comprising employing a gelatinizable starch having less than 0.1% protein.

* * * * *

UNITED STATES PATENT AND TRADEMARK OFFICE
CERTIFICATE OF CORRECTION

PATENT NO. : 6,645,541 B2
DATED : November 11, 2003
INVENTOR(S) : Morii et al.

It is certified that error appears in the above-identified patent and that said Letters Patent is hereby corrected as shown below:

<u>Column 14,</u>
Line 38, for the occurrence reading "sons", should read as -- sour --.

Signed and Sealed this

Twenty-fourth Day of February, 2004

JON W. DUDAS
*Acting Director of the United States Patent and Trademark Office*